US012230132B2

(12) United States Patent
Kushibiki

(10) Patent No.: US 12,230,132 B2
(45) Date of Patent: Feb. 18, 2025

(54) INFORMATION PROCESSING DEVICE, DRIVING DIAGNOSIS METHOD, AND STORAGE MEDIUM

(71) Applicant: TOYOTA JIDOSHA KABUSHIKI KAISHA, Aichi-ken (JP)

(72) Inventor: Yukiya Kushibiki, Gifu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 112 days.

(21) Appl. No.: 18/181,576

(22) Filed: Mar. 10, 2023

(65) Prior Publication Data

US 2023/0351892 A1 Nov. 2, 2023

(30) Foreign Application Priority Data

May 2, 2022 (JP) ................................ 2022-076202

(51) Int. Cl.
*G08G 1/0967* (2006.01)
*G08G 1/01* (2006.01)
*G08G 1/052* (2006.01)

(52) U.S. Cl.
CPC ......... *G08G 1/0967* (2013.01); *G08G 1/0112* (2013.01); *G08G 1/052* (2013.01)

(58) Field of Classification Search
CPC .... G08G 1/0967; G08G 1/0112; G08G 1/052; G08G 1/01; G08G 1/0175; G08G 1/163; G08G 1/096894; G06V 20/582; G01C 21/26; B60R 2300/10; B60R 2300/304
See application file for complete search history.

(56) References Cited

U.S. PATENT DOCUMENTS

2010/0198488 A1* 8/2010 Groitzsch .............. G08G 1/163 701/117
2014/0225749 A1* 8/2014 Saka ...................... G08G 1/093 340/905
2016/0210857 A1* 7/2016 Gao ..................... G08G 1/0129
2016/0349072 A1* 12/2016 Yoshitomi .......... G01C 21/3602
2017/0161567 A1* 6/2017 Satomura ............... G06V 20/56
2017/0174132 A1* 6/2017 Yokochi ................. B60K 35/60
(Continued)

FOREIGN PATENT DOCUMENTS

JP 2006321354 A 11/2006
JP 2007-172487 A 7/2007
(Continued)

*Primary Examiner* — Adnan Aziz
(74) *Attorney, Agent, or Firm* — HAUPTMAN HAM, LLP

(57) ABSTRACT

An information processing device includes: an acquisition unit that acquires travel information related to travel of a vehicle and information of regulation display that has been converted into information from a captured image of the regulation display, the image being an image captured by a camera mounted on the vehicle; a preprocessing unit that sets, when a reliability of the information of the regulation display that has been converted into information is equal to or higher than a threshold value, the information to a regulation value, and updates the regulation value at a certain time with any one of the regulation values in a certain section including the time; and a diagnosis unit that diagnoses a violation when the travel of the vehicle based on the travel information satisfies a violation condition based on the updated regulation value.

6 Claims, 10 Drawing Sheets

(56) References Cited

U.S. PATENT DOCUMENTS

| | | | | |
|---|---|---|---|---|
| 2017/0243483 | A1* | 8/2017 | Kaneshige | G06V 10/803 |
| 2017/0308761 | A1* | 10/2017 | Gillet | G06F 18/22 |
| 2020/0234587 | A1* | 7/2020 | Girond | G08G 1/096894 |
| 2020/0256695 | A1* | 8/2020 | Girond | B60K 35/00 |
| 2021/0024085 | A1* | 1/2021 | Kitagawa | B60W 30/10 |
| 2022/0317443 | A1* | 10/2022 | Matsui | G06V 20/588 |

FOREIGN PATENT DOCUMENTS

| | | | |
|---|---|---|---|
| JP | 201410674 | A | 1/2014 |
| JP | 2015-014988 | A | 1/2015 |
| JP | 2021-056575 | A | 4/2021 |

* cited by examiner

INFORMATION PROCESSING DEVICE, DRIVING DIAGNOSIS METHOD, AND STORAGE MEDIUM

CROSS-REFERENCE TO RELATED APPLICATION

This application claims priority to Japanese Patent Application No. 2022-076202 filed on May 2, 2022, incorporated herein by reference in its entirety.

BACKGROUND

1. Technical Field

The present disclosure relates to an information processing device, a driving diagnosis method, and a storage medium.

2. Description of Related Art

Japanese Unexamined Patent Application Publication No. 2006-321354 (JP 2006-321354 A) discloses a cruise control device for a vehicle that transmits overspeed information to a driver based on a speed regulation value acquired from a vehicle navigation system. This cruise control device prompts the driver to reduce the cruise setting vehicle speed to a safe vehicle speed equal to or lower than the vehicle speed limit.

SUMMARY

It is conceivable to acquire regulation displays from captured images and perform driving diagnosis, but there is room for improvement in accurately reading various regulation displays and performing consistent driving diagnosis.

An object of the present disclosure is to provide an information processing device, a driving diagnosis method, and a storage medium capable of performing consistent driving diagnosis based on regulation displays acquired from captured images.

An information processing device includes: an acquisition unit that acquires travel information related to travel of a vehicle and information of regulation display that has been converted into information from a captured image of the regulation display, the image being an image captured by a camera mounted on the vehicle; a preprocessing unit that sets, when a reliability of the information of the regulation display that has been converted into information is equal to or higher than a threshold value, the information to a regulation value, and updates the regulation value at a certain time with any one of the regulation values in a certain section including the time; and a diagnosis unit that diagnoses a violation when the travel of the vehicle based on the travel information satisfies a violation condition based on the updated regulation value.

In the information processing device, the acquisition unit acquires travel information related to travel of a vehicle and information of regulation display that has been converted into information from a captured image of the regulation display. The image is captured by a camera mounted on the vehicle. When a reliability of the information of the regulation display that has been converted into information is equal to or higher than a threshold value, the preprocessing unit sets the information to a regulation value, and updates the regulation value at a certain time with any one of the regulation values in a certain section including the time.

Here, the reliability of the information of the regulation display is a value indicating the likelihood of the information of the regulation display that has been converted into information from the captured image of the regulation display. The diagnosis unit diagnoses a violation when the travel of the vehicle based on the travel information satisfies a violation condition based on the updated regulation value. Here, the violation condition based on the regulation value is a condition defined using the regulation value for diagnosing that the driving of the vehicle is a violation.

When a reliability of the information of the regulation display that has been converted into information is equal to or higher than a threshold value, the information processing device sets the information to a regulation value, and updates the regulation value at a certain time with any one of the regulation values in a certain section including the time. Therefore, according to the information processing device, consistent driving diagnosis can be performed based on the regulation display acquired from the captured image.

In the information processing device, the regulation display is a display related to speed limit, the information of the regulation display is the speed limit, and the preprocessing unit updates all the regulation values in the certain section with a maximum value of the regulation values in the certain section.

In the information processing device, when the reliability of the information of the display related to the speed limit that has been converted into information is equal to or higher than a threshold value, the speed limit is set to the regulation value, and all the regulation values in the certain section are updated with the maximum value of the regulation values in the certain section. According to the information processing device, consistent driving diagnosis can be performed based on the display related to the speed limit acquired from the captured image.

In the information processing device, the regulation display is a display related to a prohibited act, the information of the regulation display is a flag representing whether there is the display related to the prohibited act, and the preprocessing unit sets the flag that is the regulation value to ON when the reliability of the information of the regulation display that has been converted into information is equal to or higher than a threshold value, and updates the flag that is all the regulation values in the certain section to ON when the flag that is the regulation value in the certain section is ON.

In the information processing device, when the reliability of the information of the display related to the prohibited act that has been converted into information is equal to or higher than a threshold value, the flag, that is the regulation value is set to ON, and when the flag that is the regulation value in the certain section is ON, the flag that is all the regulation values in the certain section is updated to ON. Here, the display related to the prohibited act is, for example, a stop sign, a no-parking sign, and a no-turning sign. According to the information processing device, consistent driving diagnosis can be performed based on the display related to the prohibited act acquired from the captured image.

The information processing device further includes, an extraction unit that extracts the captured image when the violation condition is satisfied.

In the information processing device, the captured image is extracted when the violation condition is satisfied. According to the information processing device, it is possible to record the captured image when the violation is diagnosed.

In the information processing device, the extraction unit terminates extraction of the captured image when the violation condition is no longer satisfied.

In the information processing device, the extraction of the captured image is terminated when the violation condition is no longer satisfied. According to the information processing device, it is possible to appropriately terminate the extraction of the captured image when a violation is diagnosed.

In the information processing device, the extraction unit deletes the extracted captured image when a predetermined violation cancellation condition based on the travel information is satisfied.

In the information processing device, the extracted captured image is deleted when a predetermined violation cancellation condition based on the travel information is satisfied. Here, the predetermined violation cancellation condition is a condition for deleting the diagnosis of violation and diagnosing that there is no violation. According to the information processing device, after being diagnosed with violation once, when it is diagnosed that there is no violation, the extracted captured image can be deleted.

In a driving diagnosis method, a computer executes processes including: acquiring travel information related to travel of a vehicle and information of regulation display that has been converted into information from a captured image of the regulation display, the image being captured by a camera mounted on the vehicle; setting the information to a regulation value when a reliability of the information of the regulation display that has been converted into information is equal to or higher than a threshold value; updating the regulation value at a certain time with one of the regulation values in a certain section including the time; and diagnosing a violation when the travel of the vehicle based on the travel information satisfies a violation condition based on the updated regulation value.

In the driving diagnosis method, the computer acquires travel information related to travel of a vehicle and information of regulation display that has been converted into information from a captured image of the regulation display. The image is captured by a camera mounted on the vehicle. When a reliability of the information of the regulation display that has been converted into information is equal to or higher than a threshold value, the computer sets the information to a regulation value, and updates the regulation value at a certain time with any one of the regulation values in a certain section including the time. The computer diagnoses a violation when the travel of the vehicle based on the travel information satisfies a violation condition based on the updated regulation value.

In the driving diagnosis method, when a reliability of the information of the regulation display that has been converted into information is equal to or higher than a threshold value, the information is set to a regulation value, and the regulation value at a certain time is updated with any one of the regulation values in a certain section including the time. Therefore, according to the driving diagnosis method, consistent driving diagnosis can be performed based on the regulation display acquired from the captured image.

In a storage medium, a program is a program that causes a computer to execute processes including: acquiring travel information related to travel of a vehicle and information of regulation display that has been converted into information from a captured image of the regulation display, the image being captured by a camera mounted on the vehicle; setting the information to a regulation value when a reliability of the information of the regulation display that has been converted into information is equal to or higher than a threshold value; updating the regulation value at a certain time with one of the regulation values in a certain section including the time; and diagnosing a violation when the travel of the vehicle based on the travel information satisfies a violation condition based on the updated regulation value.

In the storage medium, the computer acquires travel information related to travel of a vehicle and information of regulation display that has been converted into information from a captured image of the regulation display. The image is captured by a camera mounted on the vehicle. When a reliability of the information of the regulation display that has been converted into information is equal to or higher than a threshold value, the computer sets the information to a regulation value, and updates the regulation value at a certain time with any one of the regulation values in a certain section including the time. The computer diagnoses a violation when the travel of the vehicle based on the travel information satisfies a violation condition based on the updated regulation value.

In the program, when a reliability of the information of the regulation display that has been converted into information is equal to or higher than a threshold value, the information is set to a regulation value, and the regulation value at a certain time is updated with any one of the regulation values in a certain section including the time. Therefore, according to the driving diagnosis method, consistent driving diagnosis can be performed based on the regulation display acquired from the captured image.

According to the present disclosure, consistent driving diagnosis can be performed based on the regulation display acquired from the captured image.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A driving diagnosis system including an information processing device of the present disclosure will be described. The driving diagnosis system is a system that performs driving diagnosis using information of traffic signs collected in a vehicle and travel information of the vehicle. In the driving diagnosis system, a captured image is recorded when a violation is determined.

Overall Configuration

Figure 1:
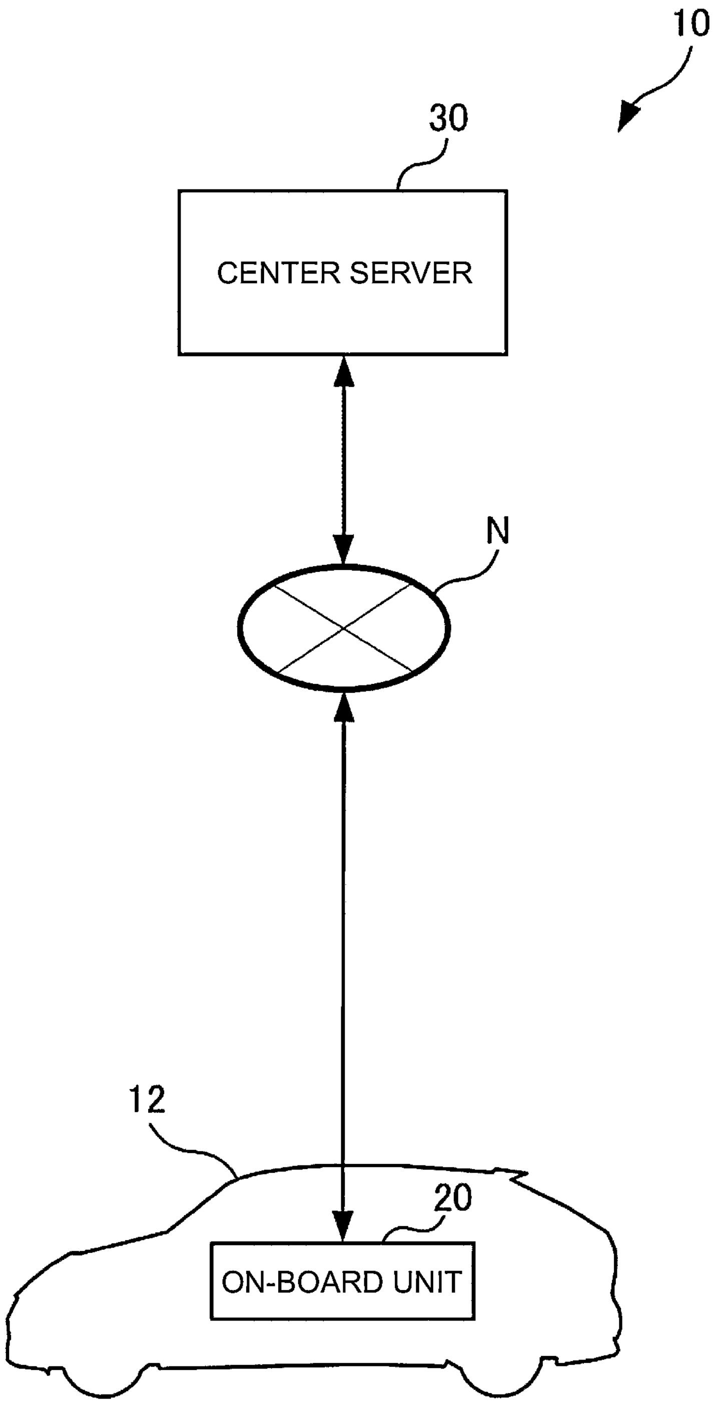
FIG. 1 is a diagram showing a schematic configuration of a driving diagnosis system according to the present embodiment.

As shown in FIG. 1, a driving diagnosis system 10 according to the present embodiment includes a vehicle 12 and a center server 30 serving as an information processing device. The vehicle 12 is equipped with an on-board unit 20. The on-board unit 20 and the center server 30 are connected to each other through a network N. Although FIG. 1 shows one vehicle 12 and one on-board unit 20 with respect to one center server 30, the numbers of the vehicles 12 and the on-board units 20 are not limited to one.

The center server 30 is installed in, for example, a manufacturer that manufactures the vehicle 12, a car dealer, or any business operator.

Vehicle

Figure 2:
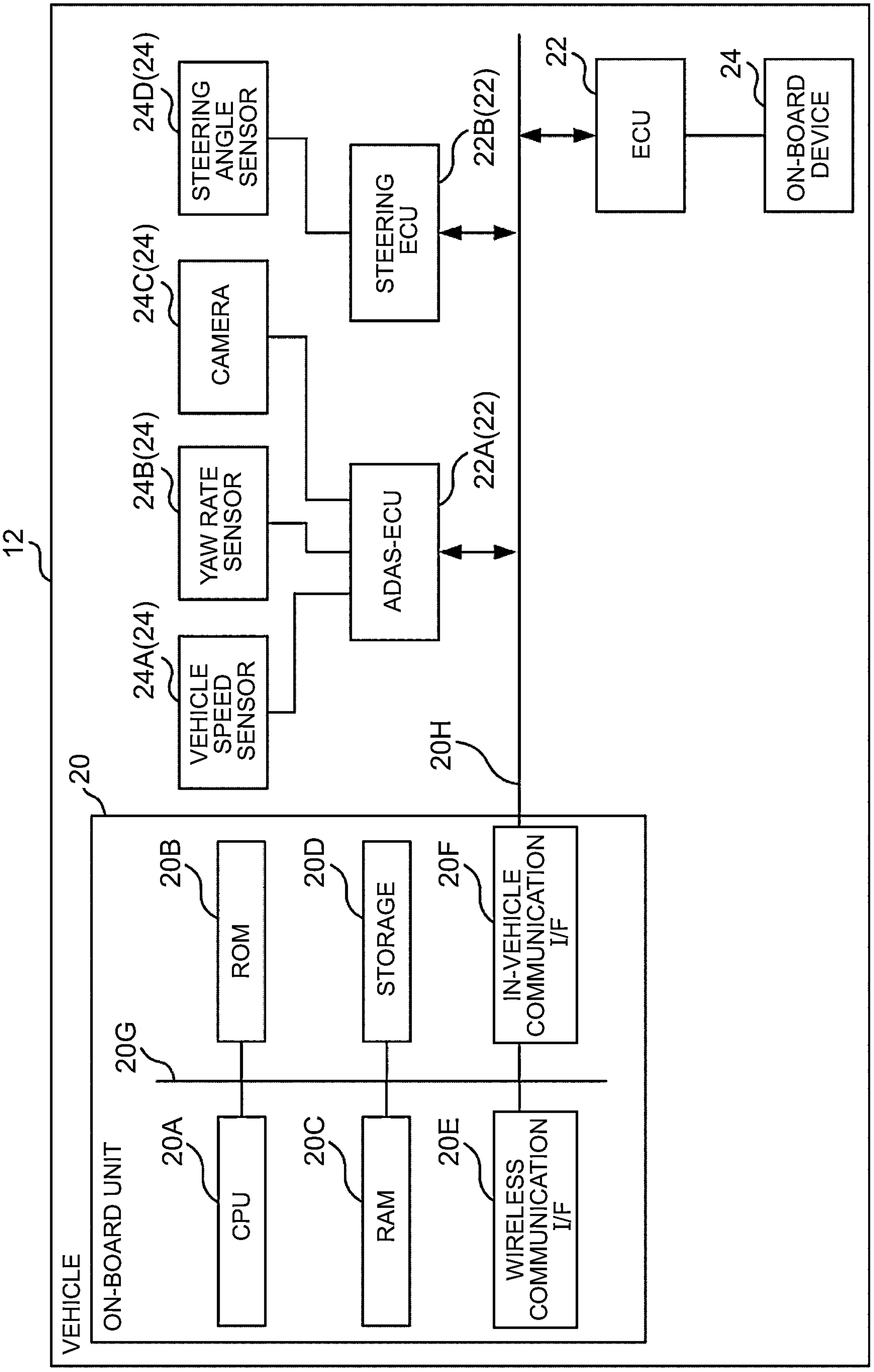
FIG. 2 is a block diagram showing a hardware configuration of a vehicle according to the present embodiment.

As shown in FIG. 2, the vehicle 12 according to the present embodiment includes the on-board unit 20, a plurality of electronic control units (ECUs) 22, and a plurality of on-board devices 24.

The on-board unit 20 includes a central processing unit (CPU) 20A, a read-only memory (ROM) 20B, a random access memory (RAM) 20C, a storage 20D, a wireless communication interface (I/F) 20E, and an in-vehicle communication I/F 20F. The CPU 20A, the ROM 20B, the RAM 20C, the storage 20D, the wireless communication I/F 20E, and the in-vehicle communication I/F 20F are connected so as to be able to communicate with each other via an internal bus 20G.

The CPU 20A is a central processing unit that executes various programs and controls various units. That is, the CPU 20A reads a program from the ROM 20B or the storage 20D and executes the program using the RAM 20C as a work area.

Figure 3:
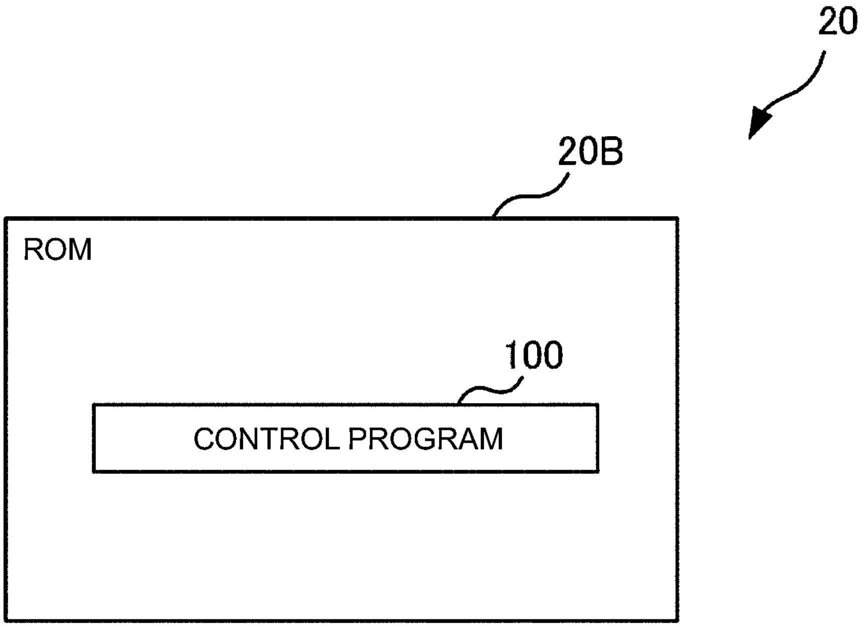
FIG. 3 is a block diagram showing a configuration of a read-only memory (ROM) of an on-board unit according to the present embodiment.

The ROM 20B stores various programs and various data. As shown in FIG. 3, a control program 100 is stored in the ROM 20B of the present embodiment. The control program 100 is a program for transmitting, to the center server 30, information of regulation display that has been converted into information from an image captured by a camera.

As shown in FIG. 2, the RAM 20C temporarily stores a program or data as a work area.

Figure 4:
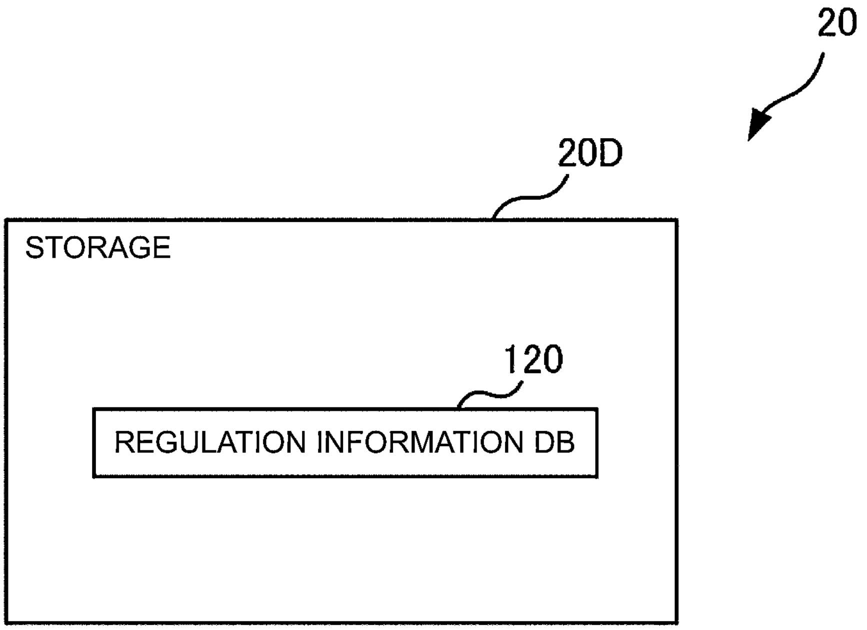
FIG. 4 is a block diagram showing a configuration of a storage of the on-board unit according to the present embodiment.

The storage 20D that is a memory is composed of a hard disk drive (HDD) or a solid state drive (SSD), and stores various programs and various data. As shown in FIG. 4, the storage 20D of the present embodiment stores a regulation information database (DB) 120, which is a data group of the information of the regulation display that has been converted into information. Note that the storage 20D may store the control program 100 and the regulation information DB 120.

As shown in FIG. 2, the wireless communication I/F 20E is a wireless communication module for communicating with the center server 30. For the wireless communication module, for example, communication standards such as fifth generation (5G), long term evolution (LTE), and Wi-Fi (registered trademark) are used. The wireless communication I/F 20E is connected to the network N.

The in-vehicle communication I/F 20F is an interface for connecting to each of the ECUs 22. For the interface, a communication standard based on a controller area network (CAN) protocol is used. The in-vehicle communication I/F 20F is connected to an external bus 20H.

The ECUs 22 include at least an advanced driver assistance system (ADAS)-ECU 22A, a steering ECU 22B, a brake ECU 22C, and an engine ECU 22D.

The ADAS-ECU 22A controls an advanced driver assistance system in an integrated manner. A vehicle speed sensor 24A, a yaw rate sensor 24B, and a camera 24C that constitute the on-board devices 24 are connected to the ADAS-ECU 22A. The camera 24C is a camera that captures images of the surroundings of the vehicle 12.

The steering ECU 22B controls power steering. A steering angle sensor 24D constituting the on-board devices 24 is connected to the steering ECU 22B. The steering angle sensor 24D is a sensor that detects the steering angle of the steering wheel.

Figure 5:
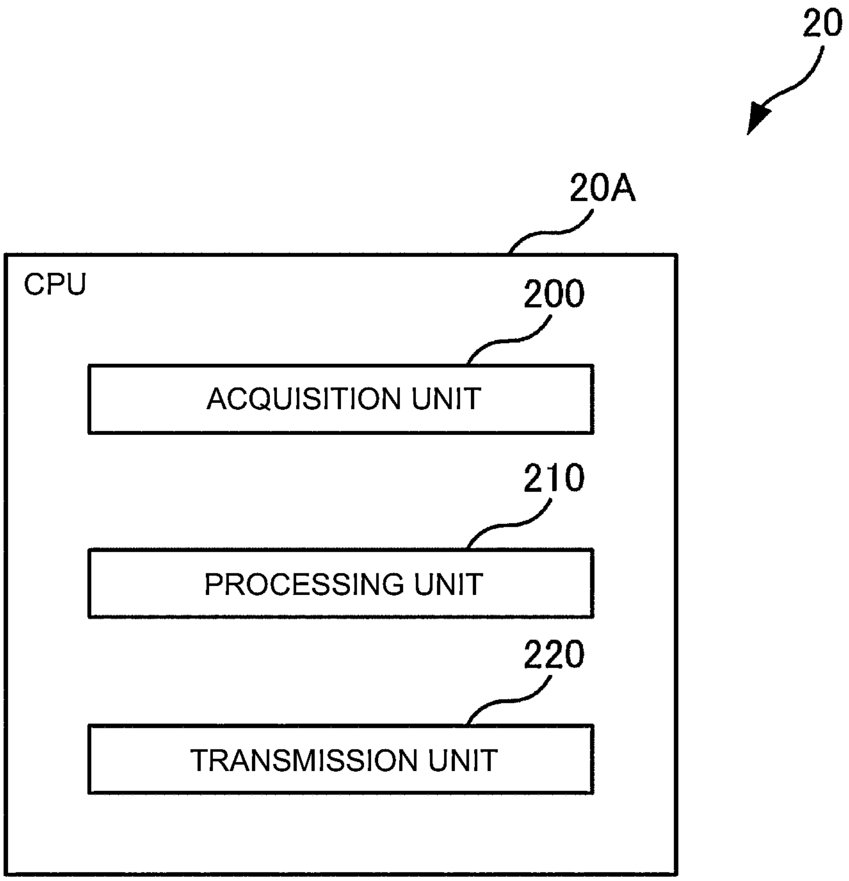
FIG. 5 is a block diagram showing a functional configuration of the on-board unit according to the present embodiment.

As shown in FIG. 5, in the on-board unit 20 of the present embodiment, the CPU 20A functions as an acquisition unit 200, a processing unit 210, and a transmission unit 220 by executing the control program 100.

The acquisition unit 200 has a function of acquiring vehicle information. The vehicle information is information such as the state of the on-board devices 24, the state of the vehicle 12 obtained from the on-board devices 24, and the captured images captured in the vehicle 12. The vehicle information of the present embodiment includes travel information such as position information, vehicle speed, yaw rate, or steering angle. The vehicle information also includes captured images of the outside of the vehicle 12 captured by the camera 24C.

The processing unit 210 causes the storage 20D to store the vehicle information acquired by the acquisition unit 200, and recognizes the regulation display from the captured images captured by the camera 24C, thereby converting the images into information of the regulation display. Specifically, the processing unit 210 of the present embodiment causes the storage 20D to temporarily store the vehicle information, and then transmits the vehicle information to the center server 30 via the transmission unit 220 when requested from the center server 30. The processing unit 210 also converts the captured images captured by the camera 24C into information by image recognition processing to obtain the information of the regulation display, and derives the reliability of the information of the regulation display.

More specifically, the processing unit 210 recognizes a speed limit sign or a prohibition sign, which are regulation displays represented by the captured images, and converts them into information of the speed limit, stop, no parking, and no turning.

The transmission unit 220 has a function of transmitting the vehicle information and the information of the regulation display stored in the storage 20D to the center server 30. Specifically, the transmission unit 220 of the present embodiment transmits the vehicle information and the information of the regulation display stored in the storage 20D to the center server 30) when requested by the center server 30.

Center Server

Figure 6:
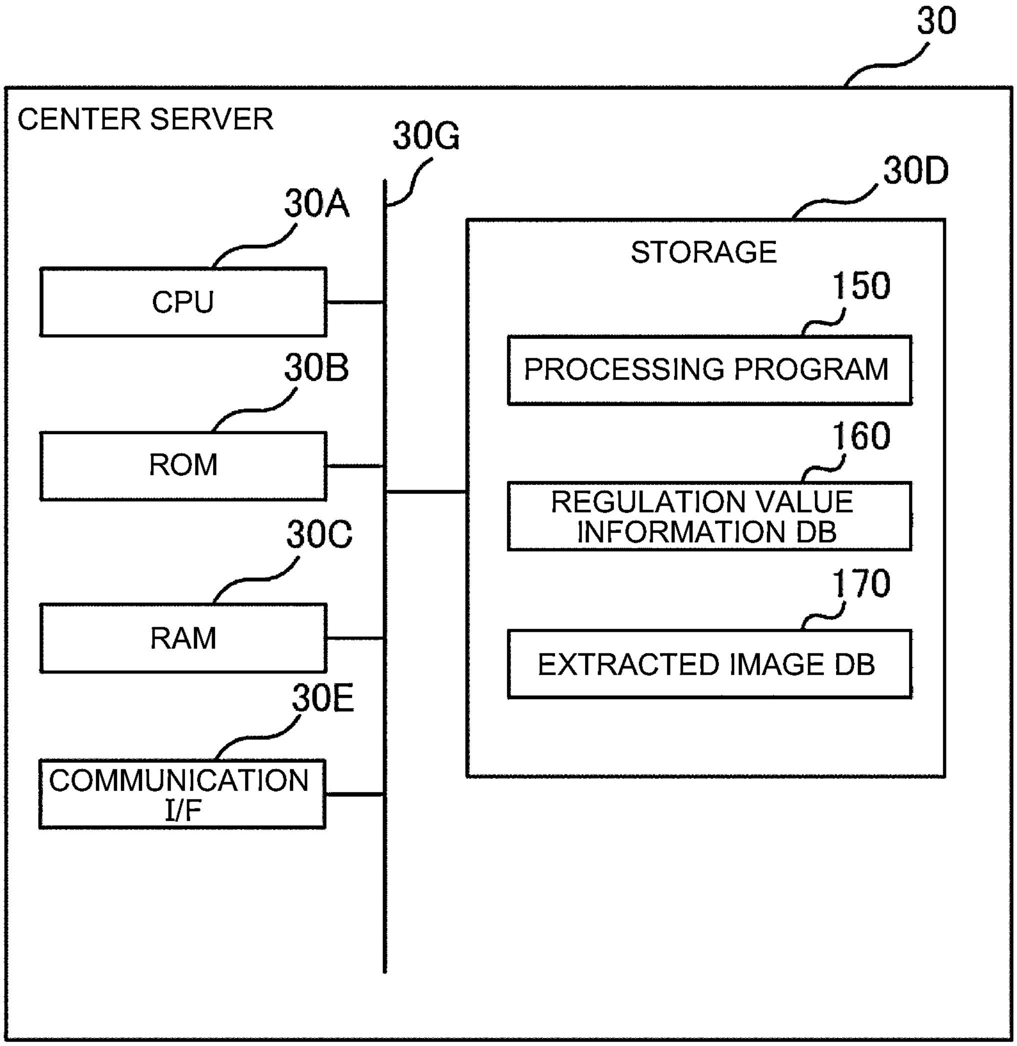
FIG. 6 is a block diagram showing a hardware configuration of a center server according to the present embodiment.

As shown in FIG. 6, the center server 30 includes a CPU 30A, a ROM 30B, a RAM 30C, a storage 30D, and a communication I/F 30E. The CPU 30A, the ROM 30B, the RAM 30C, the storage 30D, and the communication I/F 30E are connected so as to be able to communicate with each other via an internal bus 30G. The functions of the CPU 30A, the ROM 30B, the RAM 30C, the storage 30D, and the communication I/F 30E are the same as those of the CPU 20A, the ROM 20B, the RAM 20C, the storage 20D, and the wireless communication I/F 20E of the on-board unit 20 described above. The communication I/F 30E may perform wired communication. The CPU 30A is an example of a processor.

A processing program 150 as a program, a regulation value information DB 160, and an extracted image DB 170 are stored in the storage 30D of the present embodiment. Note that the ROM 30B may store the processing program 150 and the regulation value information DB 160.

The processing program 150 is a program for controlling the center server 30. With the execution of the processing program 150, the center server 30 collects the information of the regulation display from the vehicle 12 and executes various processes for performing the driving diagnosis on the travel information of the vehicle 12.

The regulation value information DB 160 stores the information of the regulation display and the reliability collected from the vehicle 12.

Specifically, the information of the speed limit, stop, no parking, and no turning, which has been converted into information at each position, is stored together with the reliability.

The extracted image DB 170 stores captured images included in the vehicle information when a violation is diagnosed.

Figure 7:
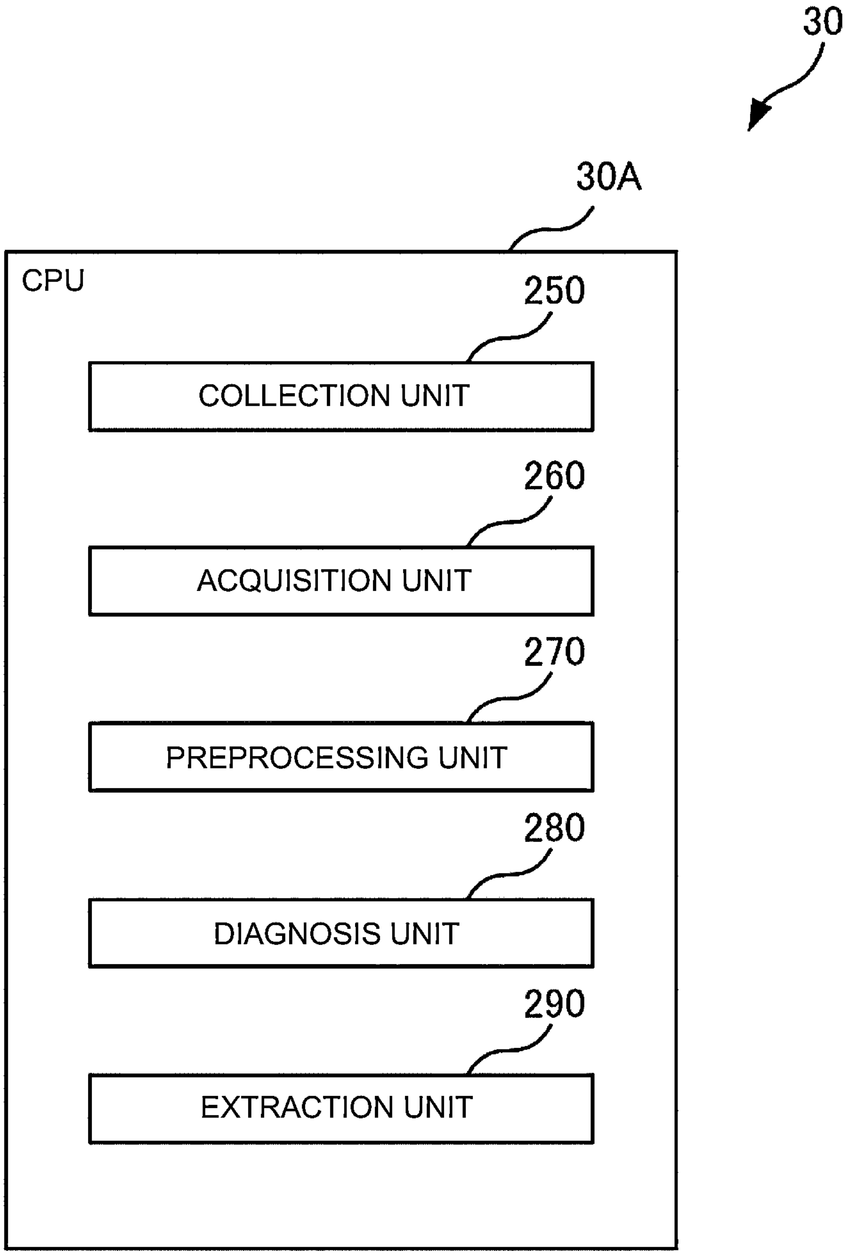
FIG. 7 is a block diagram showing a functional configuration of the center server according to the present embodiment.

As shown in FIG. 7, in the center server 30 of the present embodiment, the CPU 30A functions as a collection unit 250, an acquisition unit 260, a preprocessing unit 270, a diagnosis unit 280, and an extraction unit 290 by executing the processing program 150.

The collection unit 250 has a function of acquiring the information of the regulation display from the on-board unit 20 of the vehicle 12. The collection unit 250 causes the regulation value information DB 160 to store the acquired information of the regulation display together with the reliability and the position information indicating the position that has been converted into information.

The acquisition unit 260 has a function of acquiring the vehicle information of the vehicle 12 from the on-board unit 20 of the vehicle 12.

When the reliability of the information of the regulation display that has been converted into information is equal to or higher than a threshold value, the preprocessing unit 270 sets the information to a regulation value, and updates the regulation value at a certain time with any one of the regulation values in a certain section including the time.

Specifically, when the regulation display that has been converted into information is a sign related to the speed limit, the preprocessing unit 270 updates all the regulation values in the certain section with the maximum value of the speed limit, which is the regulation value in the certain section.

More specifically, when the reliability of the sign related to the speed limit is equal to or higher than a threshold value (for example, 50%), the speed limit that has been converted into information is recorded. Then, in order to avoid erroneous detection or undetection of the sign related to the speed limit, a filtering process is performed by replacing the recorded speed limit with the maximum value of the certain section of one second before and after, to update all the speed limits in the certain section with the maximum value.

In addition, in the case where the regulation display that has been converted into information is a display related to a prohibited act, when the reliability of the information of the regulation display that has been converted into information is equal to or higher than a threshold value (for example, 50%), the preprocessing unit 270 sets the flag that is the regulation value to ON, and when a flag that is the regulation value in a certain section is ON, all the flags that are the regulation values in the certain section are updated to ON.

For example, when the reliability of the stop sign is equal to or higher than 50%, the flag related to the stop sign is turned ON (1) and recorded. Then, in order to avoid erroneous detection or undetection of the stop sign, a filtering process is performed by replacing the recorded flag with the maximum value of the certain section of 0.2 seconds before and after, to update all the flags in the certain section with the maximum value.

Also, when the reliability of the no-parking sign is equal to or higher than 50%, the flag related to the no-parking sign is turned ON (1) and recorded. Then, in order to avoid erroneous detection or undetection of the no-parking sign, a filtering process is performed by replacing the recorded flag with the maximum value of the certain section of 0.2 seconds before and after, to update all the flags in the certain section with the maximum value.

Also, when the reliability of the no-turning sign is equal to or higher than 50%, the flag related to the no-turning sign is turned ON (1) and recorded. Then, in order to avoid erroneous detection or undetection of the no-turning sign, a filtering process is performed by replacing the recorded flag with the maximum value of the certain section of 0.2 seconds before and after, to update all the flags in the certain section with the maximum value.

The diagnosis unit 280 diagnoses a violation when travel of the vehicle based on the travel information included in the vehicle information acquired from the on-board unit 20 of the vehicle 12 satisfies a violation condition based on the updated regulation value.

Specifically, the diagnosis unit 280 diagnoses whether the driving of the vehicle 12 is considered a violation on the violation condition that the vehicle 12 is traveling significantly exceeding the speed limit in the vicinity of the sign related to the speed limit.

For example, "vehicle speed>speed limit+overspeed" is set as the violation condition. The overspeed is 20 km/h, 30 km/h, or 40 km/h.

Further, the diagnosis unit 280 diagnoses whether the driving of the vehicle 12 is considered a violation on a violation condition that the vehicle 12 does not stop in the vicinity of the stop sign.

For example, in the case where the flag related to the stop sign is ON, when it is provisionally diagnosed as a violation but the vehicle speed becomes less than a threshold value (for example, 1 km/h), the provisional diagnosis of the violation is deleted, and it is diagnosed that no violation has been made.

Further, the diagnosis unit 280 diagnoses whether the driving of the vehicle 12 is considered a violation on the violation condition that the vehicle 12 is parked in the vicinity of the no-parking sign.

For example, when the flag related to the no-parking sign is ON and the vehicle speed is less than a threshold value (for example, 1 km/h), it is provisionally diagnosed as a violation, but when the duration of the state in which the vehicle speed is less than the threshold value (1 km/h) is less than a threshold value (for example, 180 seconds), the provisional diagnosis of violation is deleted and it is diagnosed that no violation has been made.

Further, the diagnosis unit 280 diagnoses whether the driving of the vehicle 12 is considered a violation on the violation condition that the vehicle 12 makes a turn in the vicinity of the no-turning sign.

For example, when the flag related to the no-turning sign is ON, it is provisionally diagnosed as a violation, but when the maximum yaw angle of the vehicle 12 is less than a threshold value (for example, 150°) and the maximum steering angle of the steering wheel of the vehicle 12 is less than a threshold value (for example, 400°), the provisional diagnosis of violation is deleted and it is diagnosed that no violation has been made.

When the violation condition is satisfied, the extraction unit 290 extracts the captured image included in the vehicle information acquired from the on-board unit 20 of the vehicle 12 and causes the extracted image DB 170 to store the image.

When the violation condition is no longer satisfied, the extraction unit 290 terminates the extraction of the captured image included in the vehicle information acquired from the on-board unit 20 of the vehicle 12, and causes the extracted image DB 170 to store the extracted captured image.

The extraction unit 290 deletes the extracted captured image when a predetermined violation cancellation condition based on the travel information is satisfied.

Specifically, when a violation condition that the vehicle 12 is traveling significantly exceeding the speed limit in the vicinity of the sign related to the speed limit is satisfied, the extraction of the captured image included in the vehicle information acquired from the on-board unit 20 of the vehicle 12 is started. However, when the violation condition is no longer satisfied, the extraction of the captured image is terminated, and the extracted captured image is stored in the extracted image DB 170.

When the flag related to the stop sign is ON, the extraction of the captured image included in the vehicle information acquired from the on-board unit 20 of the vehicle 12 is started, and after a predetermined time (for example, 10 seconds) elapses, the extraction of the captured image is terminated, and the extracted captured image is stored in the extracted image DB 170. When a violation cancellation condition is satisfied on the violation cancellation condition that the minimum vehicle speed is less than a threshold value (for example, 1 km/h), it is considered that the vehicle 12 is temporarily stopped, and the extracted captured image is deleted.

When the flag related to the no-parking sign is ON and the vehicle speed is less than a threshold value (for example, 1 km/h), the extraction of the captured image included in the vehicle information acquired from the on-board unit 20 of the vehicle 12 is started, and when the vehicle speed reaches a value equal to or higher than a threshold value (1 km/h), the extraction of the captured image is terminated, and the extracted captured image is stored in the extracted image DB 170. When the violation cancellation condition is satisfied on the violation cancellation condition that the duration in which the vehicle speed is less than a threshold value (1 km/h) is less than a predetermined time (for example, 180 seconds), it is assumed that no parking is performed, and the extracted captured image is deleted. When the violation cancellation condition is satisfied on the violation cancellation condition that the flag related to the no-parking sign is not ON in the section where the vehicle speed is less than the threshold value (for example, 1 km/h) and for a predetermined time (for example, 5 seconds) before the section, the extracted captured image is deleted.

When the violation cancellation condition is satisfied on the violation cancellation condition that getting on and off the vehicle 12 has been performed (passenger seat, rear seat) in the section where the vehicle speed is less than a threshold value (for example, 1 km/h), it is assumed that no parking is performed, and the extracted captured image is deleted.

When the flag related to the no-turning sign is turned ON, the extraction of the captured image included in the vehicle information acquired from the on-board unit 20 of the vehicle 12 is started, and after a predetermined time (for example, 10 seconds) elapses, the extraction of the captured image is terminated, and the extracted captured image is stored in the extracted image DB 170. When the violation cancellation condition is satisfied on the violation cancellation condition that the maximum yaw angle of the vehicle 12 is less than a threshold value (for example, 150°) and the maximum steering angle of the steering wheel of the vehicle 12 is less than a threshold value (for example, 400°), the extracted captured image is deleted.

Flow of Control

The flow of processes executed by the driving diagnosis system 10 of the present embodiment will be described with reference to the flowcharts of FIG. 8 to FIG. 11. The processes in the on-board unit 20 are executed by the CPU 20A of the on-board unit 20 functioning as the acquisition unit 200, the processing unit 210, and the transmission unit 220. The processes in the center server 30 are executed by the CPU 30A of the center server 30 functioning as the collection unit 250, the acquisition unit 260, the preprocessing unit 270, the diagnosis unit 280, and the extraction unit 290.

Figure 8:
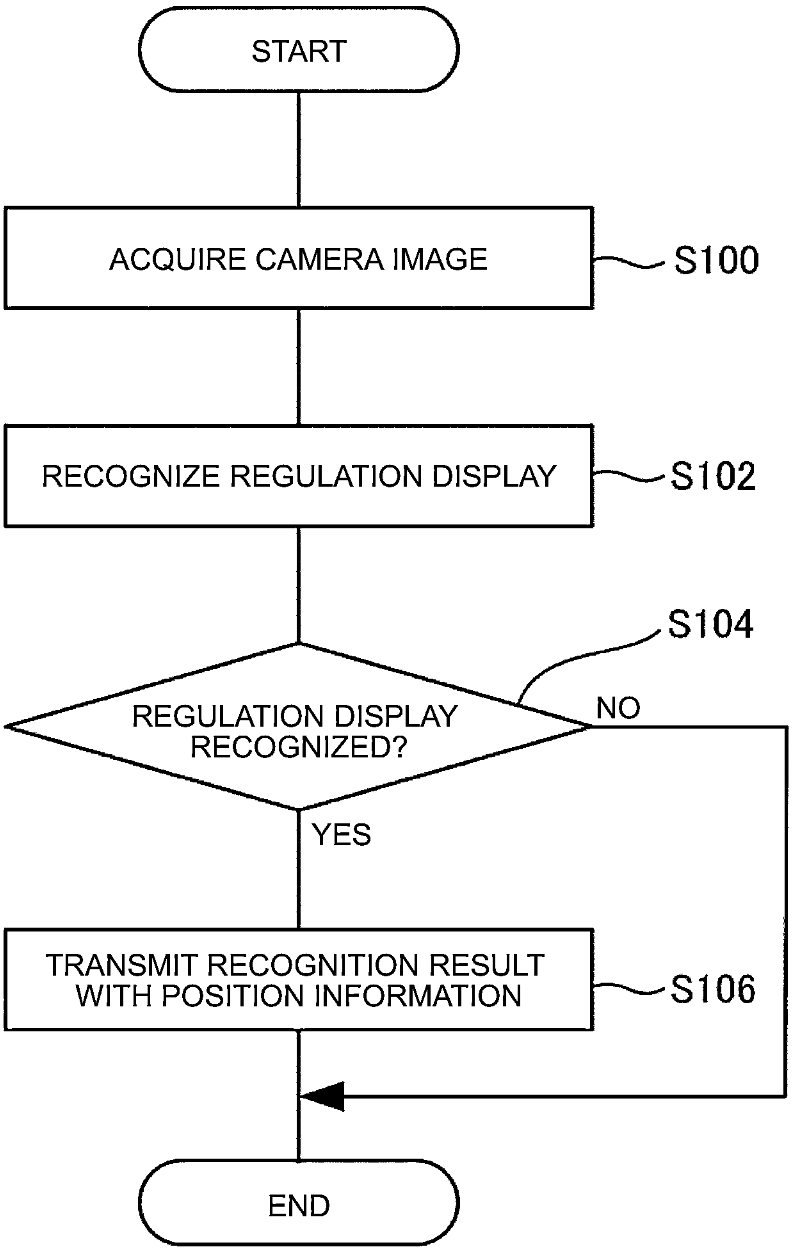
FIG. 8 is a flowchart showing a flow of a regulation display information transmission process executed in the on-board unit according to the present embodiment.

First, while the vehicle 12 is traveling, the CPU 20A of the on-board unit 20 executes the regulation display information transmission process shown in FIG. 8.

In step S100 of FIG. 8, the processing unit 210 acquires the captured image of the outside of the vehicle 12, which is captured by the camera 24C.

In step S102, the processing unit 210 recognizes the regulation display from the captured image captured by the camera 24C, converts the image into information of the regulation display, derives the reliability of the information of the regulation display, and causes the regulation information DB 120 to temporarily store the information.

In step S104, the processing unit 210 determines whether the regulation display has been recognized by the process in step S102. When the regulation display is recognized by the process in step S102, the process proceeds to step S106. On the other hand, when the regulation display is not recognized by the process in step S102, the regulation display information transmission process is terminated.

In step S106, the transmission unit 220 transmits the information of the regulation display obtained as the recognition result in step S102 to the center server 30 together with the reliability of the information of the regulation display and the position information, and ends the regulation display information transmission process.

The center server 30 causes the regulation value information DB 160 to store the information of the regulation display received from the on-board unit 20 together with the reliability and the position information of the position that has been converted into information.

While the vehicle 12 is traveling, the on-board unit 20 transmits the acquired vehicle information to the center server 30. At this time, in the center server 30, the CPU 30A repeatedly executes the driving diagnosis process shown in FIG. 9 to FIG. 11.

Figure 9:
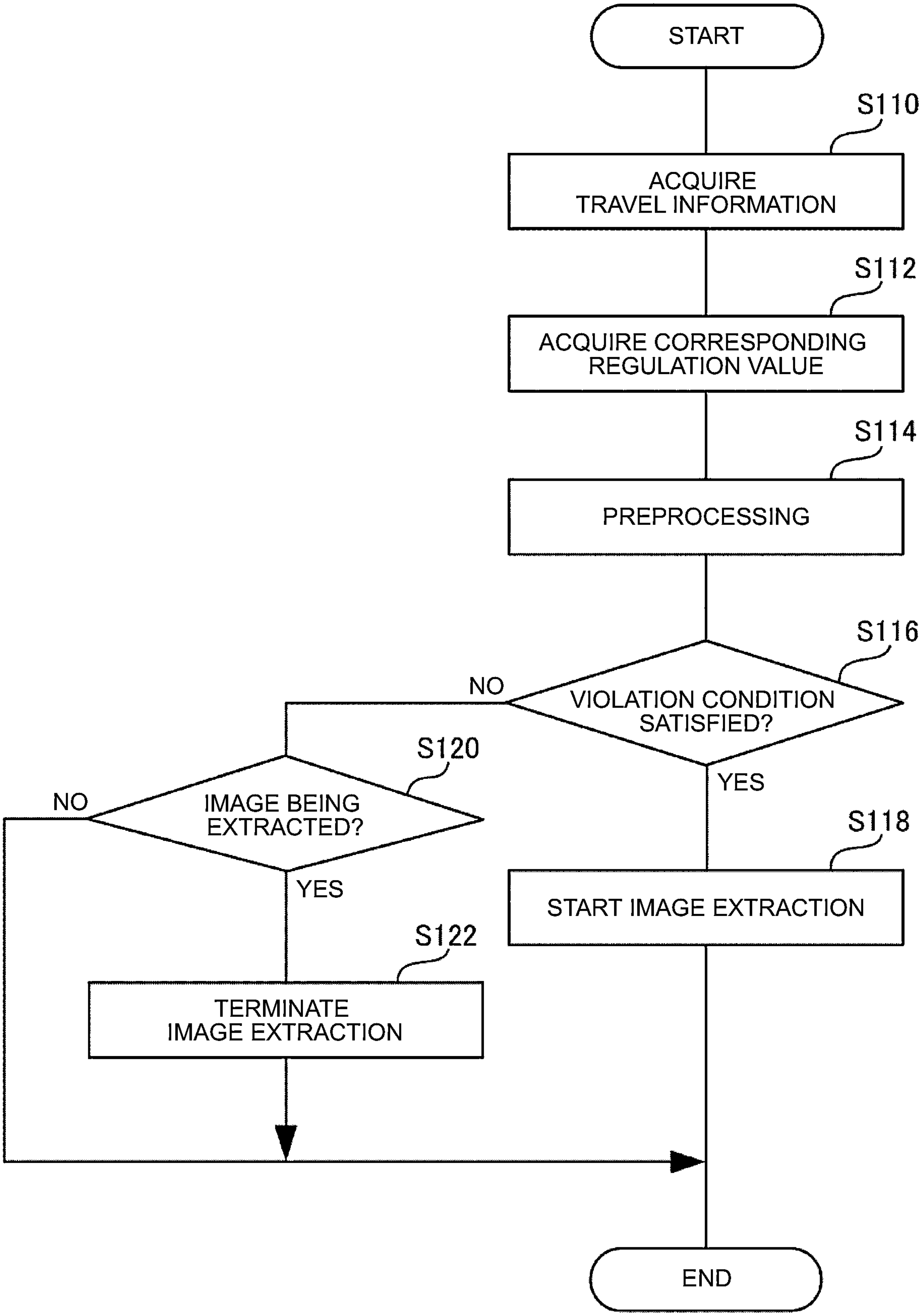
FIG. 9 is a flowchart showing a flow of a driving diagnosis process executed in the center server according to the present embodiment.

Specifically, the CPU 30A repeatedly executes the driving diagnosis process shown in FIG. 9 for the speed limit sign as the regulation display.

In step S110 of FIG. 9, the acquisition unit 260 acquires the vehicle information of the vehicle 12 from the on-board unit 20 of the vehicle 12.

In step S112, the preprocessing unit 270 acquires, from the regulation value information DB 160, the speed limit, which is the regulation value corresponding to the position information included in the acquired vehicle information, and the reliability of the sign related to the speed limit.

In step S114, when the reliability of the sign related to the speed limit acquired in step S112 is equal to or higher than a threshold value (for example, 50%), the preprocessing unit 270 records the speed limit that has been converted into information. Then, the preprocessing unit 270 performs a filtering process by replacing the recorded speed limit with the maximum value of the certain section of one second before and after, to update all the speed limits in the certain section with the maximum value.

In step S116, the diagnosis unit 280 diagnoses whether the violation condition is satisfied on the violation condition that the vehicle 12 is traveling significantly exceeding the speed limit in the vicinity of the sign related to the speed limit. When the violation condition is satisfied, the driving of the vehicle 12 is considered a violation, and the process proceeds to step S118. On the other hand, when the violation condition is not satisfied, the process proceeds to step S120.

In step S118, the extraction unit 290 starts extracting the captured image included in the vehicle information acquired from the on-board unit 20 of the vehicle 12.

In step S120, the extraction unit 290 determines whether the captured image is being extracted. When the captured image is being extracted, the process proceeds to step S122, the extraction of the captured image is terminated, and the extracted captured image is stored in the extracted image DB 170. On the other hand, when the captured image is not being extracted, the driving diagnosis process is terminated.

Figure 10:
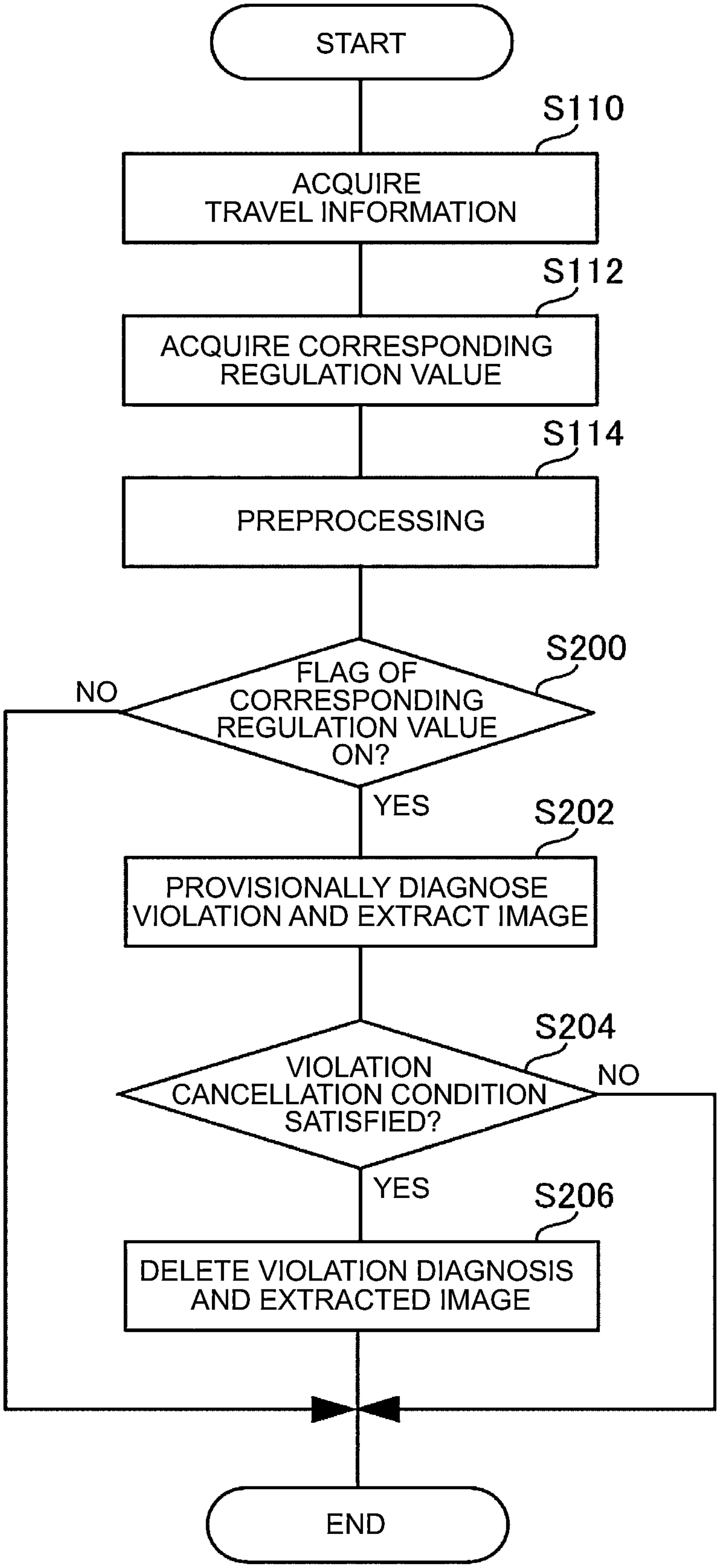
FIG. 10 is a flowchart showing the flow of the driving diagnosis process executed in the center server according to the present embodiment.

The CPU 30A repeatedly executes the driving diagnosis process shown in FIG. 10 for the stop sign as the regulation display. Note that processing similar to that in FIG. 9 above will be described with the same reference signs.

In step S110 of FIG. 10, the acquisition unit 260 acquires the vehicle information of the vehicle 12 from the on-board unit 20 of the vehicle 12.

In step S112, the preprocessing unit 270 acquires, from the regulation value information DB 160, the flag related to the stop sign, which is the regulation value corresponding to the position information included in the acquired vehicle information, and the reliability of the stop sign.

In step S114, when the reliability of the stop sign acquired in step S112 is equal to or higher than a threshold value (for example, 50%), the preprocessing unit 270 turns ON (1) the flag related to the stop sign, and records the flag. Then, the preprocessing unit 270 performs a filtering process by replacing the recorded flag with the maximum value of the certain section of 0.2 seconds before and after, to update all the flags in the certain section with the maximum value.

In step S200, the diagnosis unit 280 determines whether the flag related to the stop sign acquired in step S112 is ON. When the flag related to the stop sign acquired in step S112 is not ON, the driving diagnosis process is terminated. On the other hand, when the flag related to the stop sign acquired in step S112 is ON, the diagnosis unit 280 provisionally diagnoses a violation in step S202. When the flag related to the stop sign is turned ON, the extraction unit 290 starts extracting the captured image included in the vehicle information acquired from the on-board unit 20 of the vehicle 12, and after a predetermined time (for example, 10 seconds) elapses, stops the extraction of the captured image, and causes the extracted image DB 170) to store the extracted captured image.

In step S204, the extraction unit 290 determines whether the violation cancellation condition is satisfied on the violation cancellation condition that the minimum vehicle speed is less than a threshold value (for example, 1 km/h). When the violation cancellation condition is not satisfied, the diagnosis of violation is confirmed, and the driving diagnosis process is terminated. On the other hand, when the violation cancellation condition is satisfied, it is assumed that the vehicle 12 is temporarily stopped, and the process proceeds to step S206.

In step S206, the extraction unit 290 deletes the provisional diagnosis of violation and the extracted captured image, and terminates the driving diagnosis process.

The CPU 30A repeatedly executes the driving diagnosis process shown in FIG. 10 for the no-turning sign as the regulation display in the same manner of the stop sign.

Here, in step S112, the preprocessing unit 270 acquires, from the regulation value information DB 160, the flag related to the no-turning sign, which is the regulation value corresponding to the position information included in the acquired vehicle information, and the reliability of the no-turning sign.

In step S114, when the reliability of the no-turning sign acquired in step S112 is equal to or higher than a threshold value (for example, 50%), the preprocessing unit 270 turns ON (1) the flag related to the no-turning sign, and records the flag. Then, the preprocessing unit 270 performs a filtering process by replacing the recorded flag with the maximum value of the certain section of 0.2 seconds before and after, to update all the flags in the certain section with the maximum value.

In step S200, the diagnosis unit 280 determines whether the flag related to the no-turning sign acquired in step S112 is ON. When the flag related to the no-turning sign acquired in step S112 is not ON, the driving diagnosis process is terminated. On the other hand, when the flag related to the no-turning sign acquired in step S112 is ON, the diagnosis unit 280 provisionally diagnoses a violation in step S202. When the flag related to the no-turning sign is turned ON, the extraction unit 290 starts extracting the captured image included in the vehicle information acquired from the on-board unit 20 of the vehicle 12, and after a predetermined time (for example, 10 seconds) elapses, stops the extraction of the captured image, and causes the extracted image DB 170 to store the extracted captured image.

In step S204, the extraction unit 290 determines whether the violation cancellation condition is satisfied on the violation cancellation condition that the maximum yaw angle of the vehicle 12 is less than a threshold value (for example, 150°) and the maximum steering angle of the steering wheel of the vehicle 12 is less than a threshold value (for example, 400°), When the violation cancellation condition is not satisfied, the diagnosis of violation is confirmed, and the driving diagnosis process is terminated. On the other hand, when the violation cancellation condition is satisfied, it is assumed that the turn is not made, and the process proceeds to step S206.

In step S206, the extraction unit 290 deletes the provisional diagnosis of violation and the extracted captured image, and terminates the driving diagnosis process.

Figure 11:
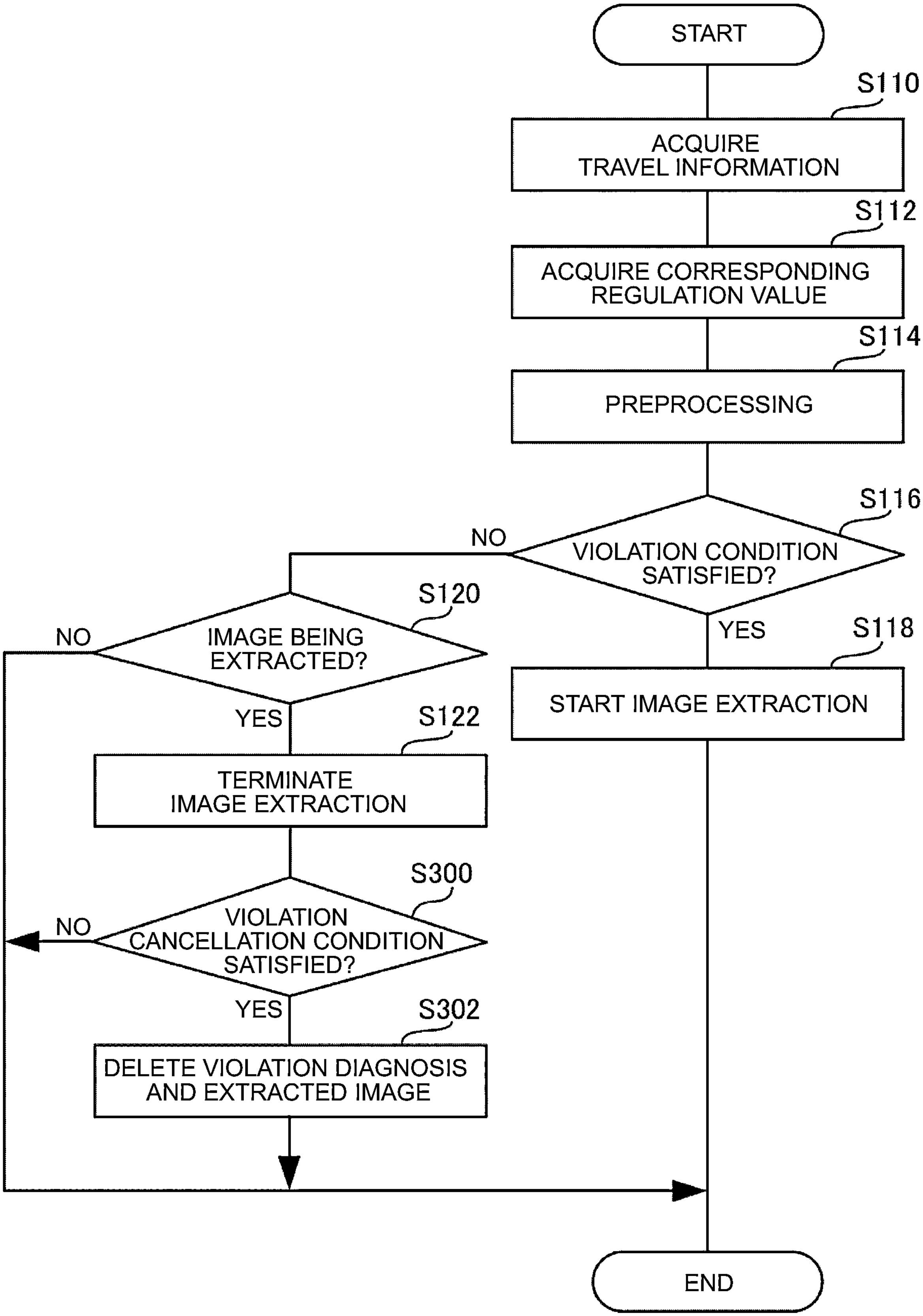
FIG. 11 is a flowchart showing the flow of the driving diagnosis process executed in the center server according to the present embodiment.

The CPU 30A repeatedly executes the driving diagnosis process shown in FIG. 11 for the no-parking sign as the regulation display. Note that processing similar to that in FIG. 9 above will be described with the same reference signs.

In step S110 of FIG. 11, the acquisition unit 260 acquires the vehicle information of the vehicle 12 from the on-board unit 20 of the vehicle 12.

In step S112, the preprocessing unit 270 acquires, from the regulation value information DB 160, the flag related to the no-parking sign, which is the regulation value corresponding to the position information included in the acquired vehicle information, and the reliability of the no-parking sign.

In step S114, when the reliability of the no-parking sign acquired in step S112 is equal to or higher than a threshold value (for example, 50%), the preprocessing unit 270 turns ON (1) the flag related to the no-parking sign, and records the flag. Then, the preprocessing unit 270 performs a filtering process by replacing the recorded flag with the maximum value of the certain section of 0.2 seconds before and after, to update all the flags in the certain section with the maximum value.

In step S116, the diagnosis unit 280 determines whether the violation condition is satisfied on the violation condition that the vehicle 12 is parked in the vicinity of the no-parking sign. When the violation condition is satisfied, the driving of the vehicle 12 is considered a violation, and the process proceeds to step S118. On the other hand, when the violation condition is not satisfied, the process proceeds to step S120.

In step S118, the extraction unit 290 starts extracting the captured image included in the vehicle information acquired from the on-board unit 20 of the vehicle 12.

In step S120, the extraction unit 290 determines whether the captured image is being extracted. When the captured image is being extracted, the process proceeds to step S122, the extraction of the captured image is terminated, and the extracted captured image is stored in the extracted image DB 170. On the other hand, when the captured image is not being extracted, the driving diagnosis process is terminated.

In step S300, the extraction unit 290 determines whether the violation cancellation condition is satisfied on the violation cancellation condition that the duration in which the vehicle speed is less than a threshold value (for example, 1 km/h) is less than a predetermined time (for example, 180 seconds). When the violation cancellation condition is not satisfied, the diagnosis of violation is confirmed, and the driving diagnosis process is terminated. On the other hand, when the violation cancellation condition is satisfied, it is assumed that the vehicle 12 is not parked, and the process proceeds to step S302.

In step S302, the extraction unit 290 deletes the provisional diagnosis of violation and the extracted captured image, and terminates the driving diagnosis process.

Summary of Embodiment

When the reliability of the information of the regulation display that has been converted into information is equal to or higher than a threshold value, the center server 30 of the present embodiment sets the information of the regulation display that has been converted into information to a regulation value, and updates the regulation value at a certain time with a maximum value of the regulation values in a certain section including the time. Therefore, according to the center server 30, consistent driving diagnosis can be performed based on the regulation display acquired from the captured image.

The center server 30 of the present embodiment extracts the captured image when the violation condition is satisfied. Therefore, according to the center server 30, it is possible to record the captured image when the violation is diagnosed.

Further, the center server 30 of the present embodiment deletes the extracted captured image when a predetermined violation cancellation condition based on the travel information is satisfied. Therefore, according to the center server 30, after being diagnosed with violation once, when it is diagnosed that there is no violation, the extracted captured image can be deleted.

Remarks

In the above embodiment, all regulation values in a certain section are updated with the maximum value of the regulation values in the certain section. However, the present disclosure is not limited to this, and all regulation values in a certain section may be updated with a frequent appearance value or a median value of the regulation values in the certain section.

It should be noted that various processors other than the CPU may execute the various processes that are executed when the CPU 20A and the CPU 30A read the software (program) in the above embodiment. In this case, a programmable logic device (PLD) in which a circuit configuration can be changed after manufacturing, such as a field-programmable gate array (FPGA), and a dedicated electric circuit or the like that is a processor having a circuit configuration specially designed to execute a specific process, such as an application specific integrated circuit (ASIC), are exemplified as a processor. Further, each process described above may be executed by one of these various processors, or by a combination of two or more processors of the same type or different types (for example, a combination of FPGAs, a combination of a CPU and an FPGA, and the like). Furthermore, the hardware structure of each of the various processors is, more specifically, an electric circuit in which circuit elements such as semiconductor elements are combined.

In the above embodiment, a mode in which each program is stored (installed) in advance in a non-transitory computer-readable recording medium (storage medium) has been described. For example, the control program 100 in the on-board unit 20 is stored in advance in the ROM 20B, and the processing program 150 in the center server 30 is stored in advance in the storage 30D. However, the present disclosure is not limited to this, and each program may be provided in a format recorded in a non-transitory recording medium (storage medium) such as a compact disc read-only memory (CD-ROM), a digital versatile disc read-only memory (DVD-ROM), and a universal serial bus (USB) memory. Further, the program may be downloaded from an external device via a network.

The flow of processes described in the above embodiment is an example, and unnecessary steps may be deleted, new steps may be added, or the process order may be changed within a range that does not deviate from the gist.

What is claimed is:

1. An information processing device, comprising:

an acquisition unit that acquires travel information related to travel of a vehicle and information of regulation display that has been converted into information from a captured image of the regulation display, the image being an image captured by a camera mounted on the vehicle;

a preprocessing unit that sets, when a reliability of the information of the regulation display that has been converted into information is equal to or higher than a threshold value, the information to a regulation value of regulation values; and updates the regulation value at a certain time with any one of the regulation values in a certain section including the certain time; and a diagnosis unit that diagnoses a violation when the travel of the vehicle based on the travel information satisfies a violation condition based on the updated regulation value, wherein the regulation display is a display related to speed limit, the information of the regulation display is the speed limit, and the preprocessing unit updates all the regulation values in the certain section with a maximum value of the regulation values in the certain section.

2. The information processing device according to claim 1, further comprising an extraction unit that extracts the captured image when the violation condition is satisfied.

3. The information processing device according to claim 2, wherein the extraction unit terminates extraction of the captured image when the violation condition is no longer satisfied.

4. The information processing device according to claim 2, wherein the extraction unit deletes the extracted captured image when a predetermined violation cancellation condition based on the travel information is satisfied.

5. A driving diagnosis method executed by a computer, the driving diagnosis method comprising:

acquiring travel information related to travel of a vehicle and information of regulation display that has been converted into information from a captured image of the regulation display, the image being an image captured by a camera mounted on the vehicle;

setting the information to a regulation value of regulation values when a reliability of the information of the regulation display that has been converted into information is equal to or higher than a threshold value;

updating the regulation value at a certain time with one of the regulation values in a certain section including the certain time; and diagnosing a violation when the travel of the vehicle based on the travel information satisfies a violation condition based on the updated regulation value, wherein the regulation display is a display related to speed limit, the information of the regulation display is the speed limit, and the method further comprises updating all the regulation values in the certain section with a maximum value of the regulation values in the certain section.

6. A non-transitory storage medium storing a program for causing, when executed by a computer, the computer to execute:

acquiring travel information related to travel of a vehicle and information of regulation display that has been converted into information from a captured image of the regulation display, the image being an image captured by a camera mounted on the vehicle;

setting the information to a regulation value of regulation values when a reliability of the information of the regulation display that has been converted into information is equal to or higher than a threshold value;

updating the regulation value at a certain time with one of the regulation values in a certain section including the certain time; and diagnosing a violation when the travel of the vehicle based on the travel information satisfies a violation condition based on the updated regulation value, wherein the regulation display is a display related to speed limit, the information of the regulation display is the speed limit, and the program, when executed by the computer, further causes the computer to execute updating all the regulation values in the certain section with a maximum value of the regulation values in the certain section.

* * * * *